United States Patent
Amend et al.

(10) Patent No.: US 9,352,445 B2
(45) Date of Patent: May 31, 2016

(54) GRINDING TOOLS WITH GUARDS

(71) Applicant: Ingersoll-Rand Company, Davidson, NC (US)

(72) Inventors: Ryan Scott Amend, Easton, PA (US); Gregory Paul Albert, Nazareth, PA (US); Douglas Eliot Pyles, Bethlehem, PA (US); Randi Jane Young, Randolph, NJ (US)

(73) Assignee: INGERSOLL-RAND COMPANY, Davidson, NC (US)

( * ) Notice: Subject to any disclaimer, the term of this patent is extended or adjusted under 35 U.S.C. 154(b) by 0 days.

(21) Appl. No.: 14/030,582

(22) Filed: Sep. 18, 2013

(65) Prior Publication Data

US 2014/0080391 A1   Mar. 20, 2014

Related U.S. Application Data

(60) Provisional application No. 61/702,389, filed on Sep. 18, 2012.

(51) Int. Cl.
   *B24B 27/08* (2006.01)
   *B24B 55/00* (2006.01)
   *B23Q 11/06* (2006.01)
   *B24B 55/05* (2006.01)

(52) U.S. Cl.
   CPC .................... *B24B 55/052* (2013.01)

(58) Field of Classification Search
   CPC .................................. B24B 55/052
   USPC ............ 451/451, 452, 455, 359, 454; 83/478
   See application file for complete search history.

(56) References Cited

U.S. PATENT DOCUMENTS

| | | | |
|---|---|---|---|
| 4,059,930 A | | 11/1977 | Alessio |
| 5,386,667 A | * | 2/1995 | Hausslein et al. ............ 451/344 |
| 5,637,035 A | * | 6/1997 | Yee ........................ B23Q 11/08 |
| | | | 144/251.2 |
| 6,464,573 B1 | * | 10/2002 | Keller .......................... 451/451 |

(Continued)

FOREIGN PATENT DOCUMENTS

| | | |
|---|---|---|
| CN | 202357043 U | 8/2012 |
| CN | 202367597 U | 8/2012 |

(Continued)

OTHER PUBLICATIONS

ISA/US, International Search Report and Written Opinion of ISA for PCT/US2013/060315, Feb. 18, 2014, 10 pages.
Desoutter, "KA16 Angle Grinder / Sander," Jul. 2008, 8 pages.
European Patent Office, Communication for European Patent Application No, 13838798.0, Oct. 29, 2015, 7 pages.

(Continued)

*Primary Examiner* — Joseph J Hail
*Assistant Examiner* — Arman Milanian
(74) *Attorney, Agent, or Firm* — Barnes & Thornburg LLP

(57) ABSTRACT

In at least one illustrative embodiment, a grinding tool may comprise a housing including a mount, a shaft extending from the mount along a drive axis, where the shaft is configured to support a grinding wheel for rotation about the drive axis, and a guard coupled to the mount. The guard may comprise a central ring extending around the mount, a shroud extending radially outward from the central ring along a first portion of a circumference of the central ring, and a standoff coupled to a second portion of the circumference of the central ring. The standoff may extend from the central ring along a direction substantially parallel to the drive axis such that the standoff limits rotation of the guard about a tipping axis that is substantially perpendicular to the drive axis.

3 Claims, 5 Drawing Sheets

(56) References Cited

U.S. PATENT DOCUMENTS

| | | | |
|---|---|---|---|
| 6,949,017 B2 * | 9/2005 | Koschel et al. | 451/358 |
| 7,537,065 B2 | 5/2009 | Gallagher et al. | |
| 7,909,680 B2 | 3/2011 | Boeck et al. | |
| 2005/0037702 A1 * | 2/2005 | Koschel et al. | 451/359 |
| 2005/0215186 A1 * | 9/2005 | Stierle et al. | 451/359 |
| 2007/0117499 A1 | 5/2007 | Chen | |
| 2011/0086583 A1 * | 4/2011 | Maute | B24B 23/02 451/359 |
| 2012/0190280 A1 * | 7/2012 | Esenwein | 451/452 |

FOREIGN PATENT DOCUMENTS

| | | | | |
|---|---|---|---|---|
| DE | 102009024427 A1 | | 12/2010 | |
| EP | 1741521 | * | 1/2007 | B24B 23/02 |
| GB | 2461783 | * | 1/2010 | B24B 23/02 |
| KR | 20100008136 A | | 1/2010 | |

OTHER PUBLICATIONS

State Intellectual Property Office of the People's Republic of China, First Office Action for CN201380048657.9, Feb. 29, 2016, 18 pages (with translation).

* cited by examiner

GRINDING TOOLS WITH GUARDS

CROSS REFERENCE TO RELATED APPLICATION

This application claims priority to U.S. Provisional Application Ser. No. 61/702,389, filed Sep. 18, 2012, the entire disclosure of which is hereby incorporated by reference.

BACKGROUND

A grinder, sander, or polisher is a power tool that includes a motor configured to drive rotation of a grinding wheel, a cut-off disc, a sanding disc, a polishing wheel, or like implement. In the present disclosure, the term "grinding tool" is used to refer to any of the foregoing, or similar, power tools, while the term "grinding wheel" is used to refer to any of the foregoing, or similar, implements. One illustrative type of grinding tool is an angle grinder, in which a rotor of the motor rotates about an axis that is non-parallel to an axis about which the grinding wheel rotates. Grinding tools are sometimes fitted with either an adjustable or fixed guard to protect operators.

SUMMARY

According to one aspect, a grinding tool may comprise a housing including a mount, a shaft extending from the mount along a drive axis, where the shaft is configured to support a grinding wheel for rotation about the drive axis, and a guard coupled to the mount. The guard may comprise a central ring extending around the mount, a shroud extending radially outward from the central ring along a first portion of a circumference of the central ring, and a standoff coupled to a second portion of the circumference of the central ring. The standoff may extend from the central ring along a direction substantially parallel to the drive axis such that the standoff limits rotation of the guard about a tipping axis that is substantially perpendicular to the drive axis.

In some embodiments, the grinding tool may further comprise a guard lock movable between an unlocked position that allows the guard to rotate about the drive axis and a locked position that blocks the guard from rotation about the drive axis. The guard lock may comprise a first retaining feature coupled to the central ring. The guard lock may further comprise a second retaining feature coupled to the mount, the second retaining feature configured to mate with the first retaining feature when the guard lock is in the locked position.

In some embodiments, the guard may be movable along the drive axis between an unlocked position in which the guard is rotatable about the drive axis and a locked position in which the guard is blocked from rotating about the drive axis. The grinding tool may further comprise a spring configured to bias the guard toward the locked position. The central ring of the guard may be formed to include a plurality of notches, and the mount may include one or more retaining members each configured to be received in one of the plurality of notches when the guard is in the locked position. The plurality of notches formed in the central ring of the guard may each open toward a central section of the mount, and each of the one or more retaining members extends radially outward from the central section of the mount.

In some embodiments, the mount may comprise an upper flange positioned above the central ring of the guard and a lower flange positioned below the central ring of the guard. The standoff may extend from the central ring of the guard toward the lower flange of the mount. The standoff may be configured to contact the lower flange of the mount when the guard rotates about the tipping axis.

In some embodiments, the guard may further comprise a shield extending outward from the shroud along a direction substantially parallel to the drive axis. The standoff may also extend radially outward from the central ring. The second portion of the circumference of the central ring may be spaced apart from the first portion of the circumference of the central ring. The standoff may comprises a tab.

According to another aspect, a grinding tool guard may comprise a central ring, a shroud extending radially outward from the central ring along a first portion of a circumference of the central ring, and a standoff coupled to a second portion of the circumference of the central ring and extending in an axial direction from the central ring.

In some embodiments, the grinding tool may further comprise a shield extending outward from the shroud along the axial direction. The standoff may also extend radially outward from the central ring. The second portion of the circumference of the central ring may be spaced apart from the first portion of the circumference of the central ring. The standoff may comprise a tab.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
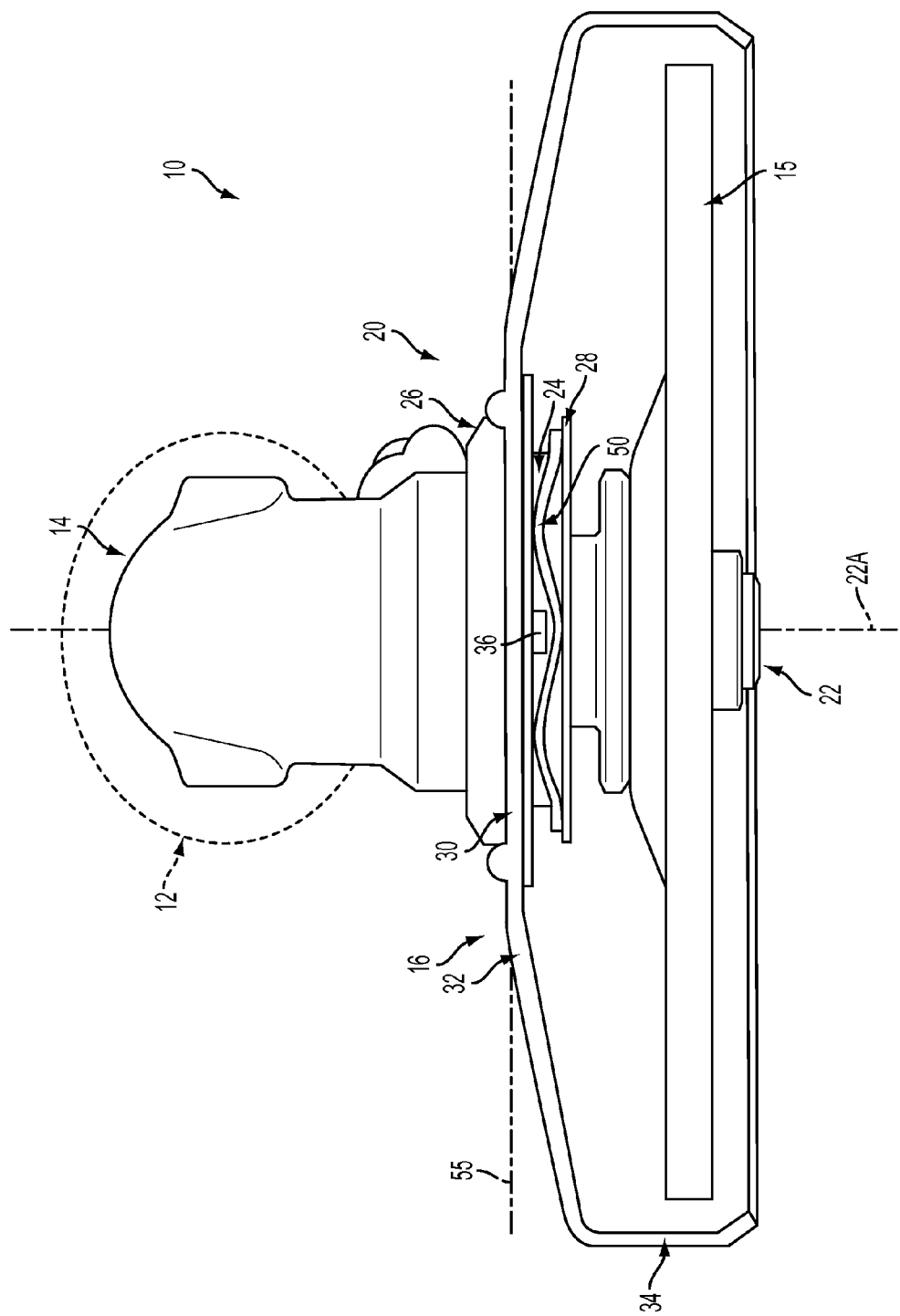
FIG. 1 is a front elevation view of at least one illustrative embodiment of an angle grinder including a head supporting a grinding wheel and a guard coupled to the head to surround a portion of the grinding wheel.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

An illustrative grinding tool, embodied as an angle grinder 10, includes a body 12, a head 14, and a guard 16 coupled to the head 14, as shown in FIG. 1. In the illustrative embodiment, the body 12 and head 14 are both enclosed in a housing of the grinder 10. The guard 16 is configured to protect operators from ground material, work pieces, fragments of a grinding wheel 15, and other objects accelerated during operation of the grinder 10. The guard 16 includes a standoff, illustratively embodied as a tab 36, that is configured to limit tipping rotation of the guard 16 when the guard 16 catches flying material, so that the guard 16 remains in position during operation of the grinder 10. The tab 36 provides support for the bottom area of the guard 16 relative to the head 14. In the event that the guard 16 is struck by a wheel fragment or other object, the tab 36 provides an anti-tip feature limiting tipping rotation of the guard 16, thereby keeping the guard 16 in position to contain the wheel fragments and/or other objects.

The head 14 illustratively includes a mount 20 and a shaft 22 extending outwardly from the mount 20 in an axial direction, as shown in FIG. 1. The mount 20 includes a central section 24, an upper flange 26, and a lower flange 28. The shaft 22 is adapted to be coupled to the grinding wheel 15 and is rotatable about a drive axis 22A.

Figure 4:
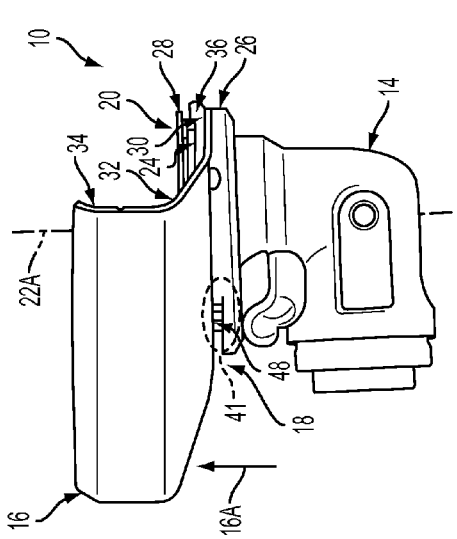
FIG. 4 is a partially diagrammatic top plan view of the angle grinder of FIG. 1 showing the guard in a first position relative to the head.
Figure 5:
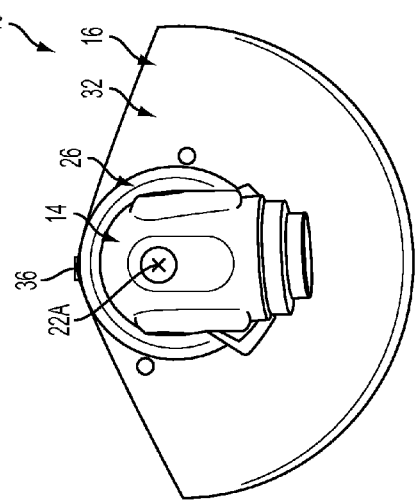
FIG. 5 is a partially diagrammatic top plan view of the angle grinder of FIG. 1 showing the guard in a second position relative to the head.
Figure 10:
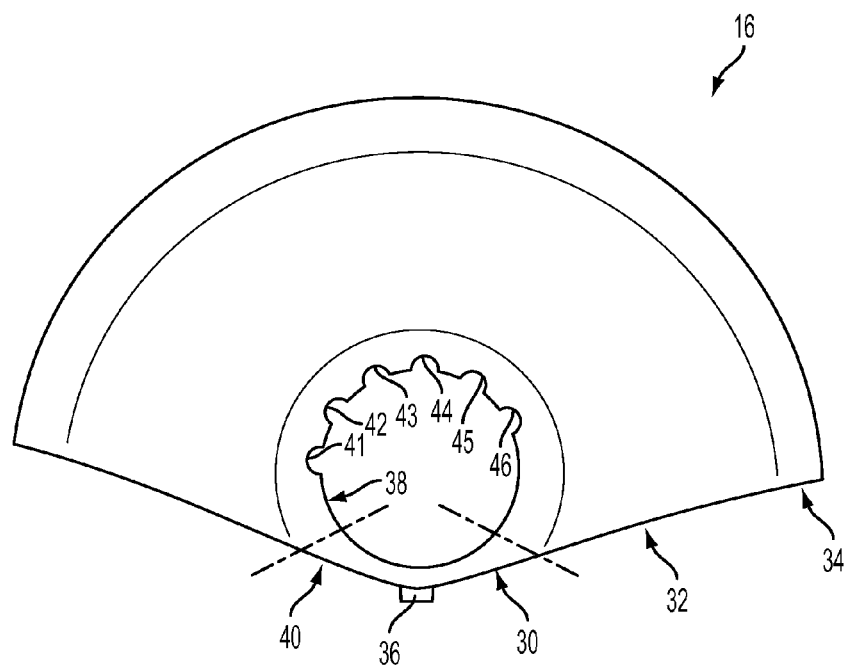
FIG. 10 is a top plan view of the guard of FIGS. 1-7.
Figure 11:
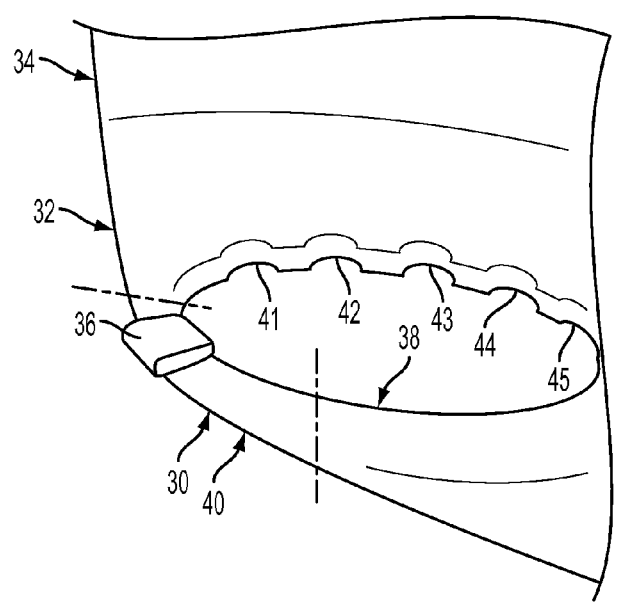
FIG. 11 is a bottom perspective view of a portion of the guard of FIGS. 1-7 and 10 showing the arrangement of the tab included in the guard.

The guard 16 is coupled to the mount 20 and is configured to be rotatable relative to the mount 20 about the drive axis 22A and to be fixable in a number of different positions as suggested by arrow 16R in FIG. 5 (compare to FIG. 4). The guard 16 illustratively includes a central ring 30, a shroud 32, a shield 34, and a tab 36, as illustrated in FIGS. 10 and 11. The shroud 32 extends outwardly in a radial direction from the central ring 30 along a first portion 38 of the circumference of the central ring 30. The shield 34 extends outwardly from the shroud 32 in the axial direction to block flying debris and grinding wheel fragments thrown during operation of the angle grinder 10. The tab 36 is coupled to the central ring 30 along a second portion 40 of the circumference of the central ring 30, as shown in FIG. 10.

The tab 36 provides support for the bottom area of the guard 16 relative to the lower flange 28 of the mount 20. In the event that the guard 16 is struck by a wheel fragment or other object, the tab 36 provides an anti-tip feature limiting tipping rotation of the guard 16 thereby keeping the guard 16 in position to properly contain the wheel fragments and/or other objects.

Figure 6:
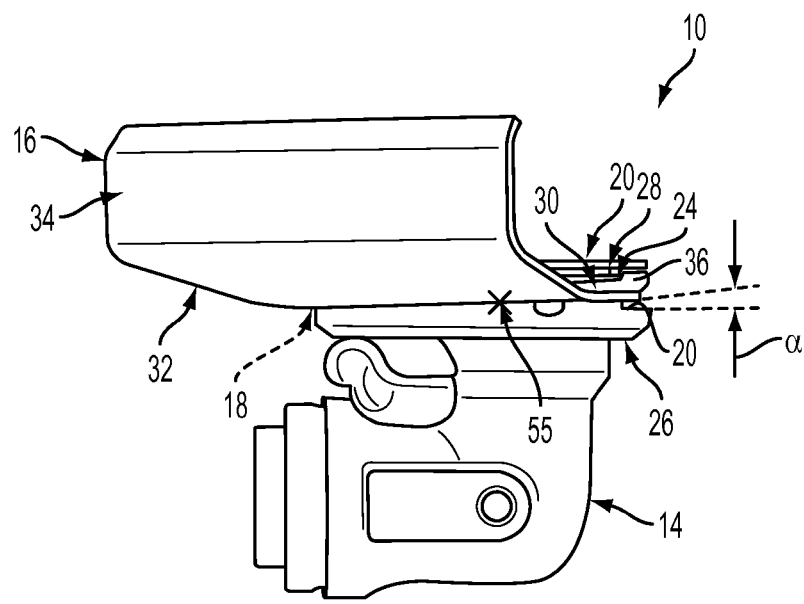
FIG. 6 is a partially diagrammatic side elevation view of the angle grinder of FIG. 1 showing that the guard includes a tab configured to limit tipping rotation of the guard.
Figure 7:
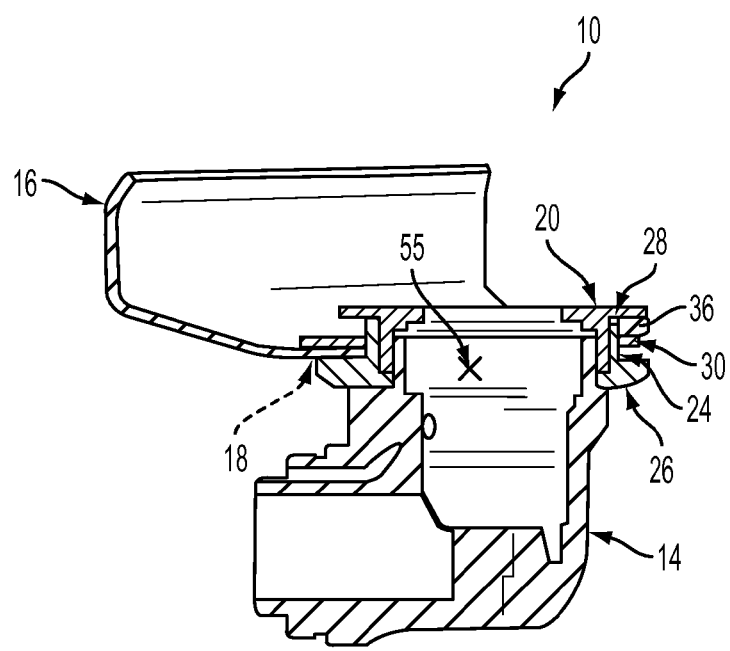
FIG. 7 is a cross sectional view of the angle grinder of FIGS. 1 and 6.
Figure 8:
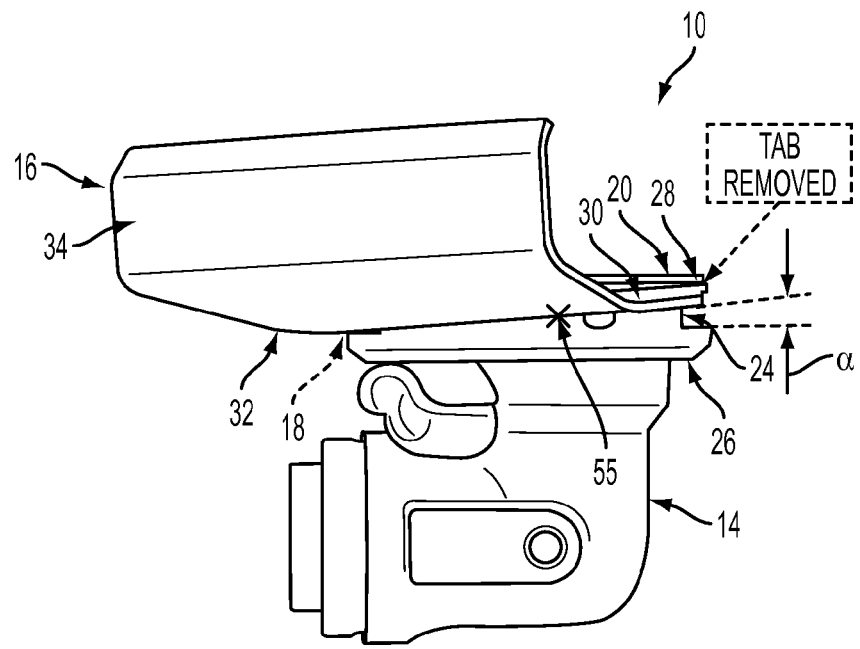
FIG. 8 is a partially diagrammatic side elevation view of an angle grinder including a guard without a standoff.
Figure 9:
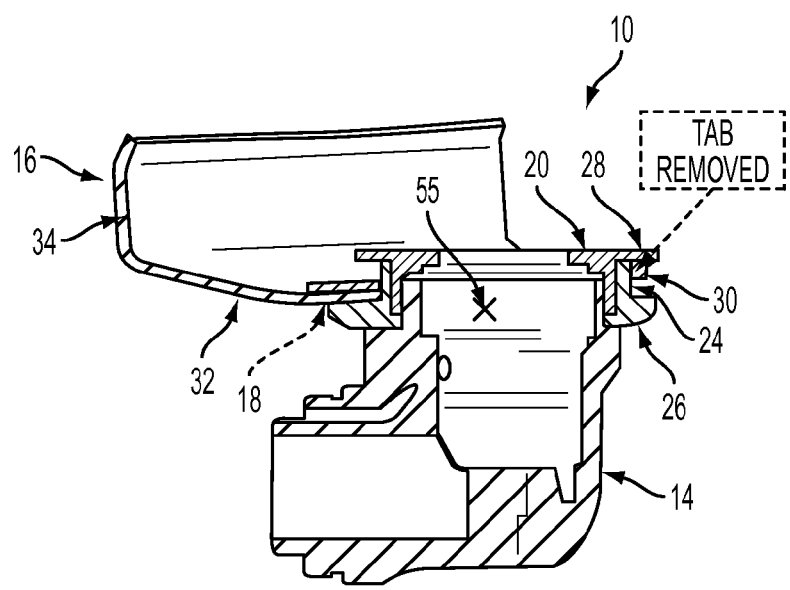
FIG. 9 is a cross sectional view of the angle grinder of FIG. 8.

The tab 36 is configured to limit rotation of the guard 16 about a tipping axis 55 that extends substantially perpendicular to the drive axis 22A. Rotation about the tipping axis 55 is denoted by angle α in FIGS. 6 and 8. Inclusion of the tab 36 on the guard 16 allows for a smaller angle α (i.e., limits tipping rotation of the guard 16), as can be seen by comparing the embodiments of FIGS. 6 and 7 (including the tab 36) with the embodiments of FIGS. 8 and 9 (not including the tab 36). It will be appreciated that the tab 36 may also limit tipping rotation of the guard 16 about any number of additional tipping axes that extend substantially perpendicular to the drive axis 22A (in addition to the tipping axis 55 denoted in FIGS. 6-9).

Specifically, the tab 36 contacts the lower flange 28 of the mount 20 in response to a containment force being applied outwardly in the radial direction to the shield 34 of the guard 16. Illustratively, the tab 36 extends outwardly in the axial direction from the central ring 30 as shown, for example, in FIG. 11. Additionally, the tab 36 extends outwardly in the radial direction from the central ring 30 and is spaced apart from the first portion 38 of the circumference of the central ring 30 as shown, for example, in FIG. 10.

Figure 2:
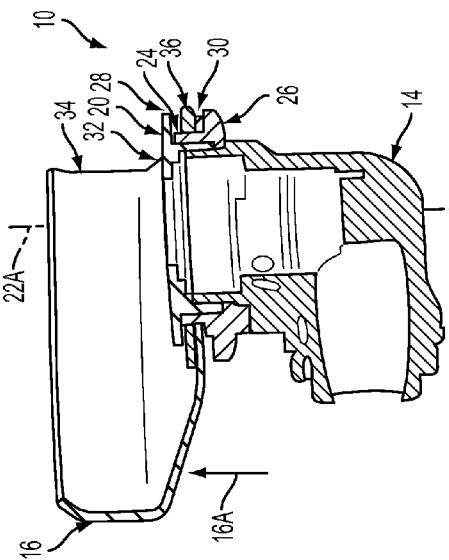
FIG. 2 is a partially diagrammatic side elevation view of the angle grinder of FIG. 1 showing a force applied to the guard to free the guard to be repositioned relative to the head.
Figure 3:
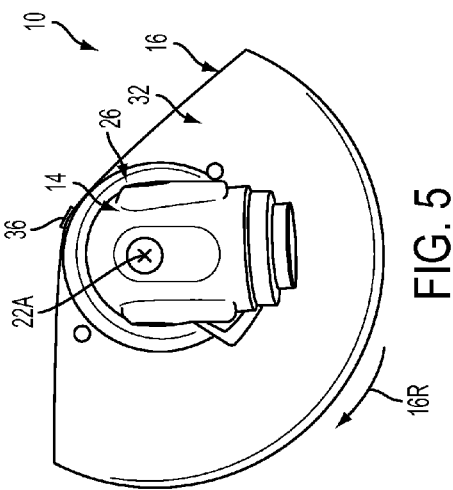
FIG. 3 is a cross-sectional view of the angle grinder of FIGS. 1 and 2.

The angle grinder 10 also includes a guard lock 18 holding the guard 16 in a selected position relative to the head 14 when the guard 16 is rotated about the drive axis 22A. The guard lock 18 is movable from a locked position to an unlocked position shown in FIGS. 2 and 3. In the locked position, the guard lock 18 blocks the guard 16 from rotation about the drive axis 22A. In the unlocked position, the guard lock 18 allows the guard 16 to rotate about the drive axis 22A. The guard lock 18 includes a series of notches 41, 42, 43, 44, 45, 46 formed in the first portion 38 of the circumference of the central ring 30, a retaining member 48 coupled to the upper flange 26 of the mount 20, and a spring 50.

In the locked position, one of the notches 41, 42, 43, 44, 45, 46 is engaged with the retaining member 48. The spring 50 is illustratively a wave spring that biases the guard lock 18 toward the locked position. The guard lock 18 is unlocked when notches 41, 42, 43, 44, 45, 46 are disengaged from the retaining member 48 in response to an operator moving the guard 16 outwardly along the drive axis 22A as suggested by arrow 16A in FIGS. 2 and 3. In other embodiments, the retaining member 48 may be coupled to the lower flange 28 of the mount 20 and a user would move the guard 16 in an opposite direction to unlock the guard lock 18.

In the illustrative embodiment, the guard lock 18 is operable without the use of tools. However, in other embodiments, tools such as screwdrivers or wrenches may be required to move the notches 41, 42, 43, 44, 45, 46 out of engagement with the retaining member 48. In some embodiments, other locking mechanisms may be employed to hold the guard 16 in place relative to the head 14.

Although the guard 16 is illustratively shown for use with angle grinder 10, it is contemplated that similar guards could be implemented on all types of grinding tools (e.g., Horizontal, Vertical, Bench). It is also contemplated that the "anti-tip" feature of the guard 16 is not limited to a tab 36, but can be any type of standoff attached to or formed in the guard 16. Additionally or alternatively to being located on the guard 16, the "anti-tip" feature could located on one of the other parts of the tool (e.g., the upper flange 26, the lower flange 28, another part of the housing, etc.) or could be a separate piece altogether.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A grinding tool comprising:
    a housing including a mount having an upper flange and a lower flange;
    a shaft extending from the mount along a drive axis, the shaft being configured to support a grinding wheel for rotation about the drive axis; and
    a guard coupled to the mount, the guard comprising a central ring extending around the mount, a shroud extending radially outward from the central ring along a first portion of a circumference of the central ring, and a standoff coupled to a second portion of the circumference of the central ring;
    wherein central ring of the guard is positioned between the upper and lower flanges of the mount and wherein the standoff extends from the central ring toward the lower flange such that the standoff is configured to directly contact the lower flange when the guard rotates about a tipping axis that is substantially perpendicular to the drive axis.

2. The grinding tool of claim 1, wherein the second portion of the circumference of the central ring is spaced apart from the first portion of the circumference of the central ring.

3. The grinding tool of claim 1, wherein the standoff comprises a tab.

* * * * *